US008803641B2

(12) United States Patent
Rofougaran

(10) Patent No.: US 8,803,641 B2
(45) Date of Patent: Aug. 12, 2014

(54) MULTIPLE DROPLET LIQUID MEMS COMPONENT

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/717,523

(22) Filed: Dec. 17, 2012

(65) Prior Publication Data

US 2014/0069783 A1    Mar. 13, 2014

Related U.S. Application Data

(60) Provisional application No. 61/699,183, filed on Sep. 10, 2012, provisional application No. 61/727,066, filed on Nov. 15, 2012.

(51) Int. Cl.
 *H01H 51/22*  (2006.01)
(52) U.S. Cl.
 USPC ............................................ 335/78; 200/181
(58) Field of Classification Search
 USPC ............................................ 335/78; 200/181
 See application file for complete search history.

(56) References Cited

U.S. PATENT DOCUMENTS

| 6,323,447 | B1 * | 11/2001 | Kondoh et al. ............... 200/182 |
| 6,512,322 | B1 * | 1/2003 | Fong et al. ..................... 310/328 |
| 6,756,552 | B2 * | 6/2004 | Takenaka et al. ............. 200/224 |
| 7,211,754 | B2 * | 5/2007 | Wang et al ..................... 200/182 |
| 7,449,649 | B2 * | 11/2008 | Gasparyan et al. ........... 200/181 |
| 2004/0150939 | A1 | 8/2004 | Huff |
| 2006/0249361 | A1 * | 11/2006 | Beerling ........................ 200/181 |
| 2012/0068801 | A1 * | 3/2012 | Duwel et al. ................... 336/20 |

FOREIGN PATENT DOCUMENTS

EP    1214854 A1    6/2002

OTHER PUBLICATIONS

Simon et al., "A Liquid-Filled Microrelay with a Moving Mercury Microdrop," Journal of Microelectromechanical Systems, vol. 6, No. 3, Sep. 1997; 9 pgs.
Sen, P.; Chang-Jin Kim, "A Liquid-Metal RF MEMS Switch with DC-to-40 GHz Performance," Micro Electro Mechanical Systems, 2009. MEMS 2009. IEEE 22nd International Conference on, pp. 904-907, Jan. 25-29, 2009; 4 pgs.
Kondoh et al., "High-Reliability, High-Performance RF Micromachined Switch Using Liquid Metal," Journal of Microelectromechanical Systems, vol. 14, No. 2, Apr. 2005; 7 pgs.

(Continued)

Primary Examiner — Bernard Rojas
(74) Attorney, Agent, or Firm — Garlick & Markison; Randy W. Lacasse

(57) ABSTRACT

A liquid micro-electro-mechanical system (MEMS) component includes a board, a channel, multiple liquid droplets, and one or more conductive elements. The channel is within the board and contains the multiple liquid droplets. A first liquid droplet has first properties and a second liquid droplet has second properties. When a force is applied upon the first and second liquid droplets, the first liquid droplet changes in accordance with the first properties with respect to the one or more conductive elements and the second liquid droplet changes in accordance with the second properties with respect to the one or more conductive elements thereby changing one or more characteristics of the liquid MEMS component.

20 Claims, 12 Drawing Sheets

(56) References Cited

OTHER PUBLICATIONS

Chung-Hao Chen; Peroulis, D., "Liquid RF MEMS Wideband Reflective and Absorptive Switches," Microwave Theory and Techniques, IEEE Transactions on, vol. 55, No. 12, pp. 2919-2929, Dec. 2007; 11 pgs.

Varadan, V. K., Vinoy, K.J. and Jose, K.A., "Microelectromechanical Systems (MEMS) and Radio Frequency MEMS, in RF MEMS and Their Applications," John Wiley & Sons, Ltd, Chichester, UK; pp. 1-49, May 2003; 49 pgs.

* cited by examiner

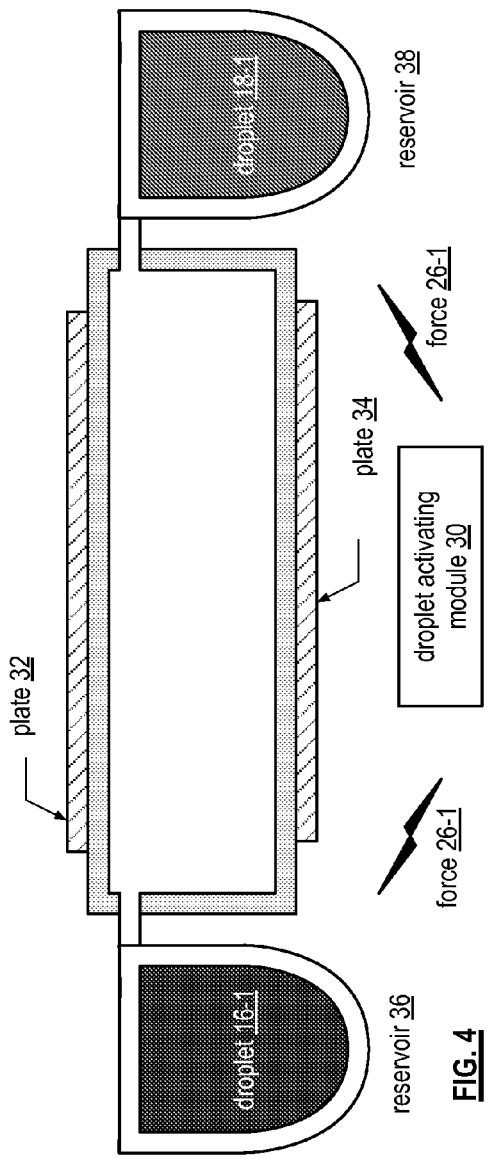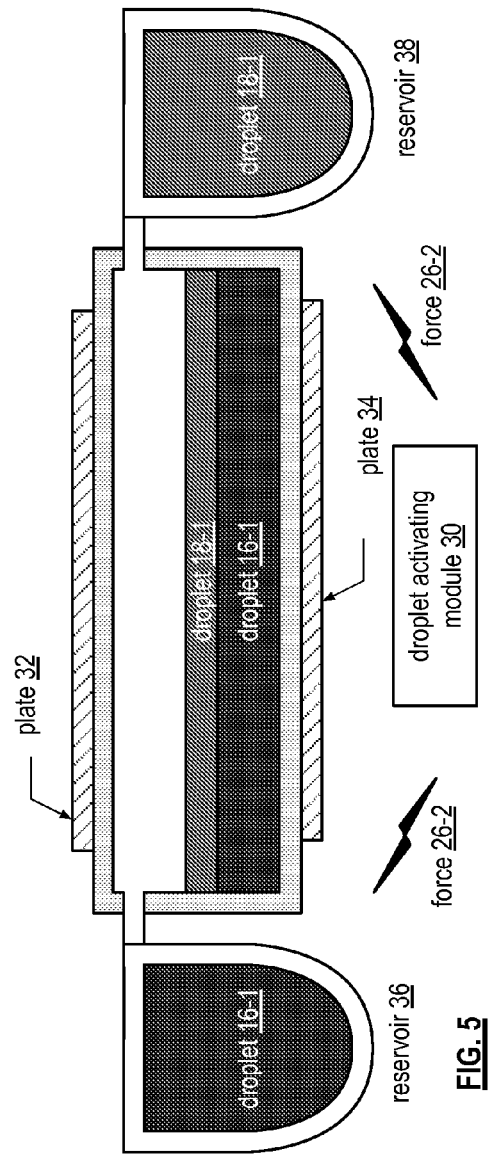

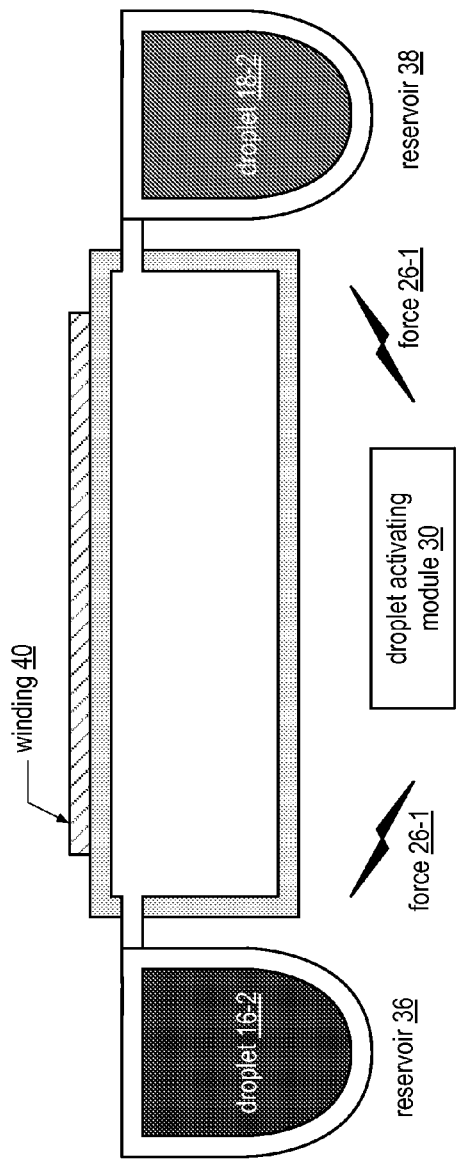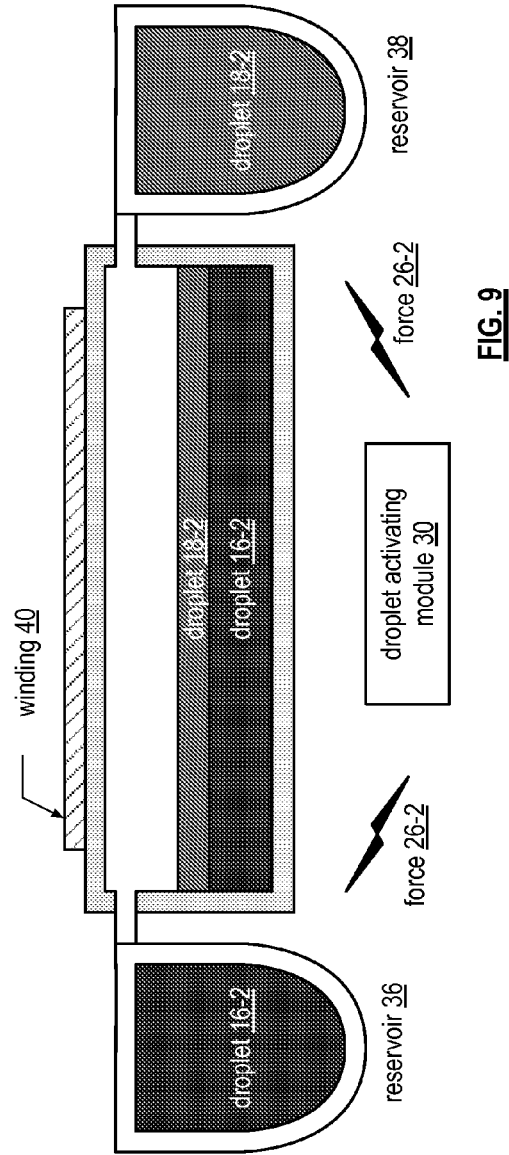

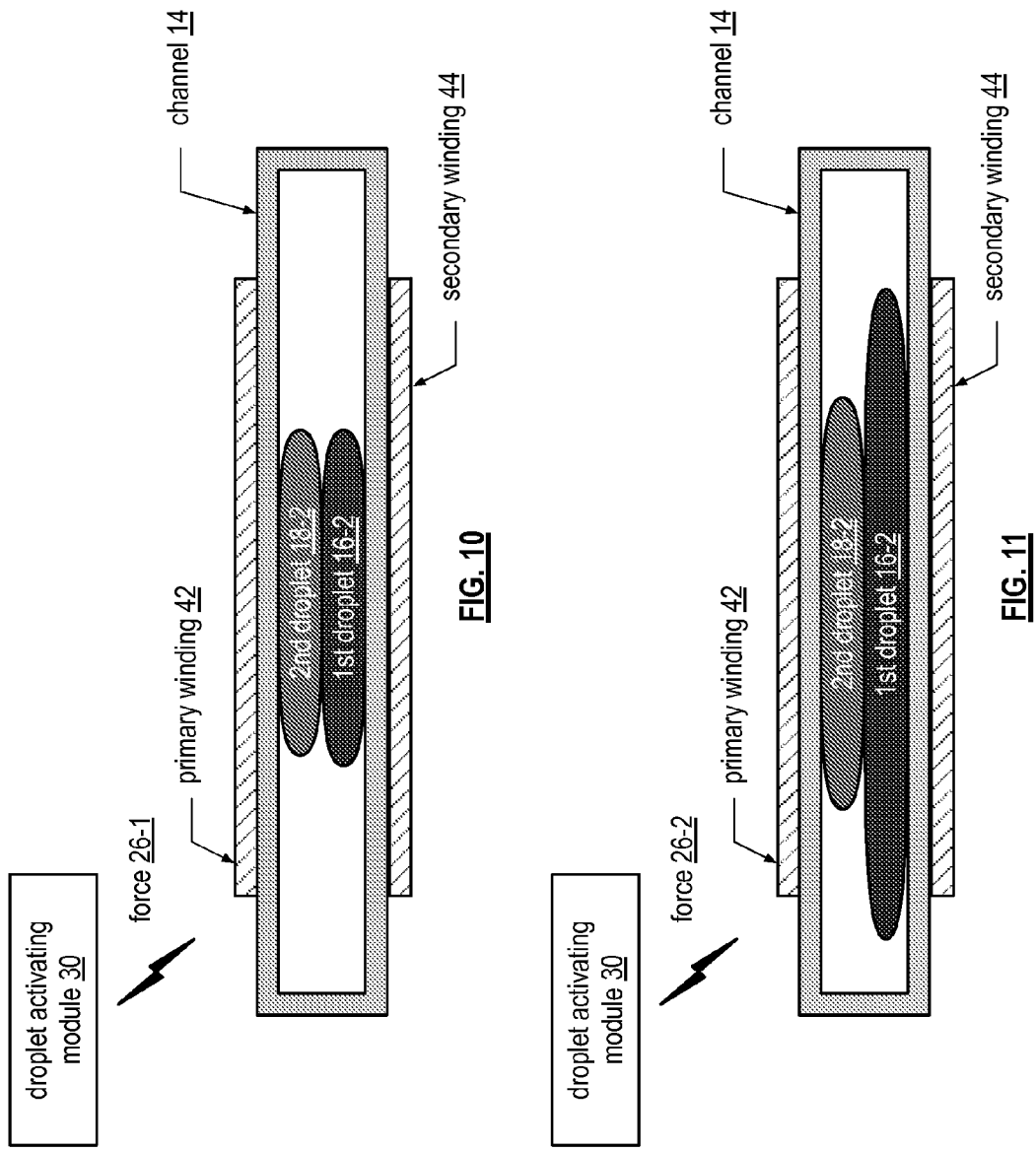

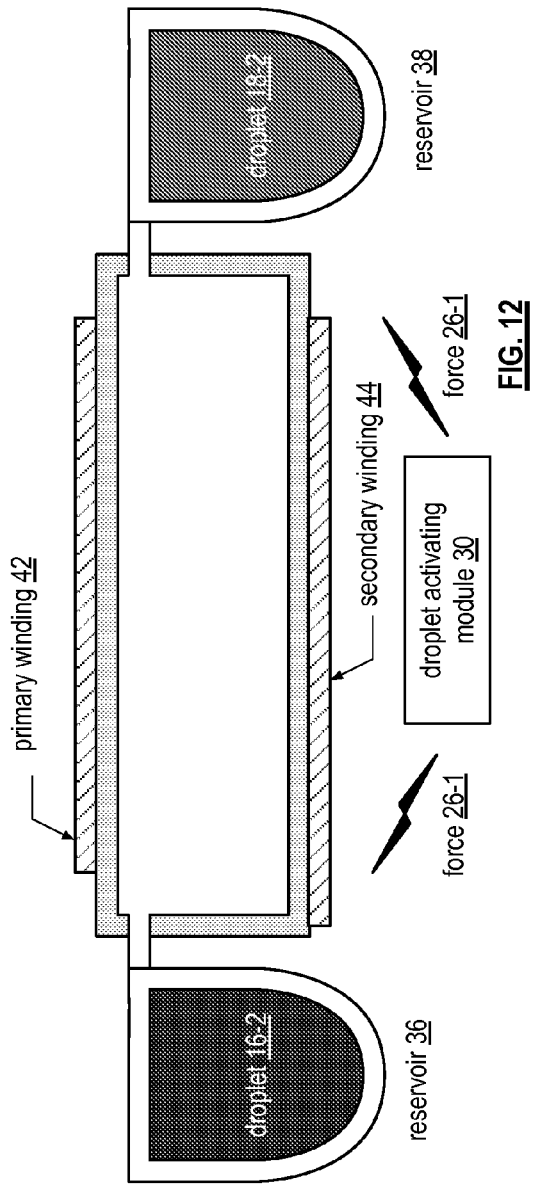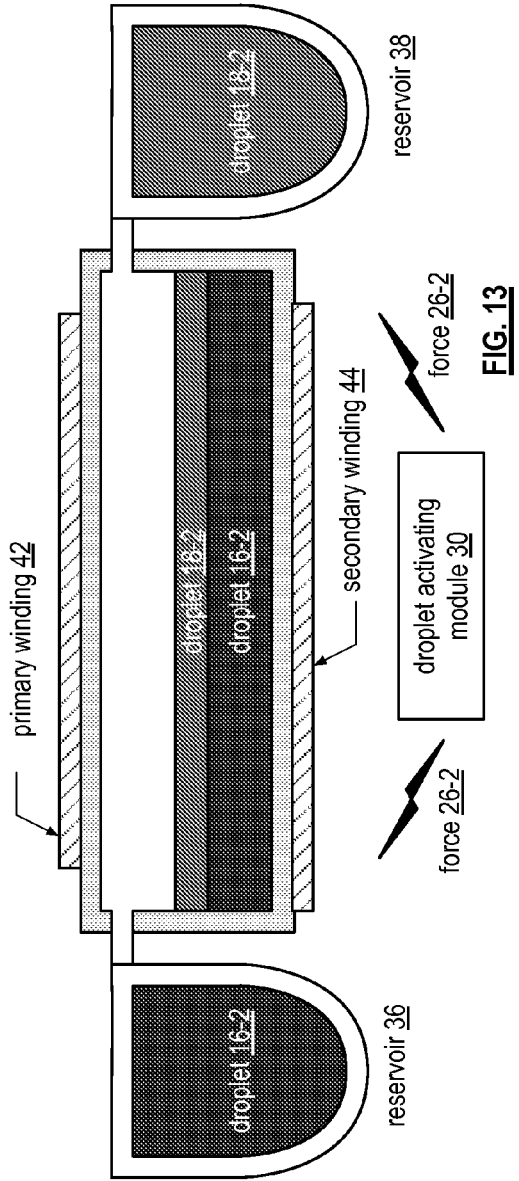

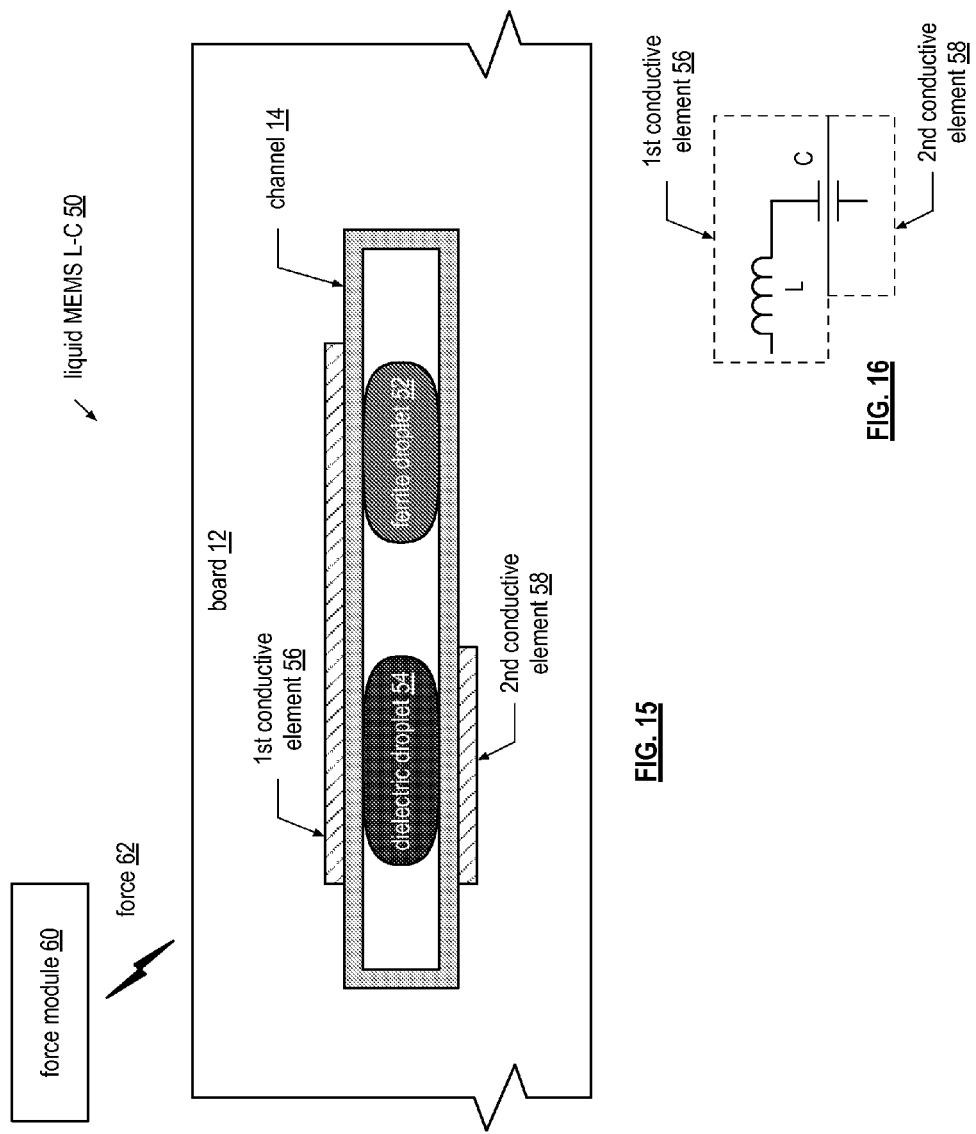

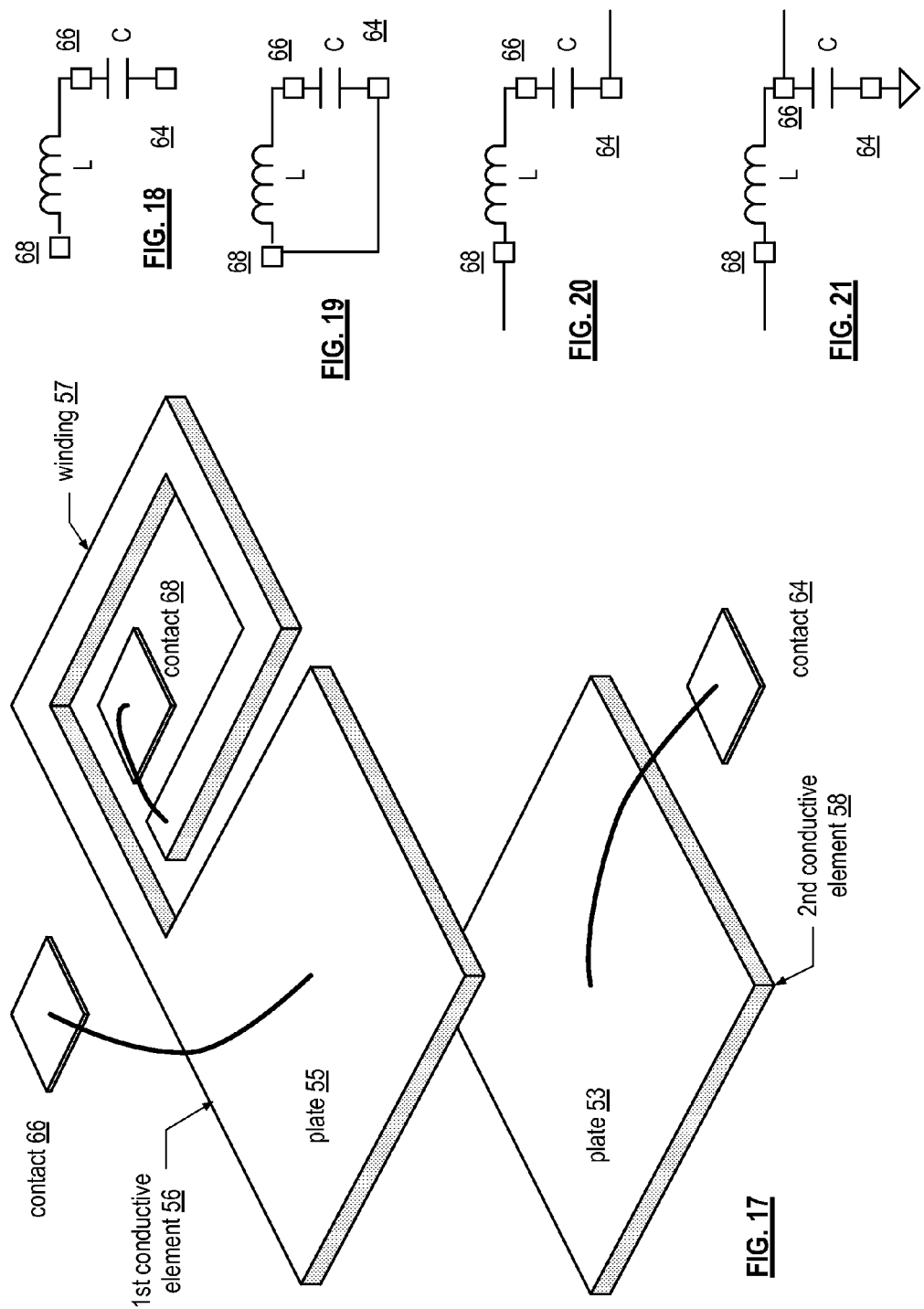

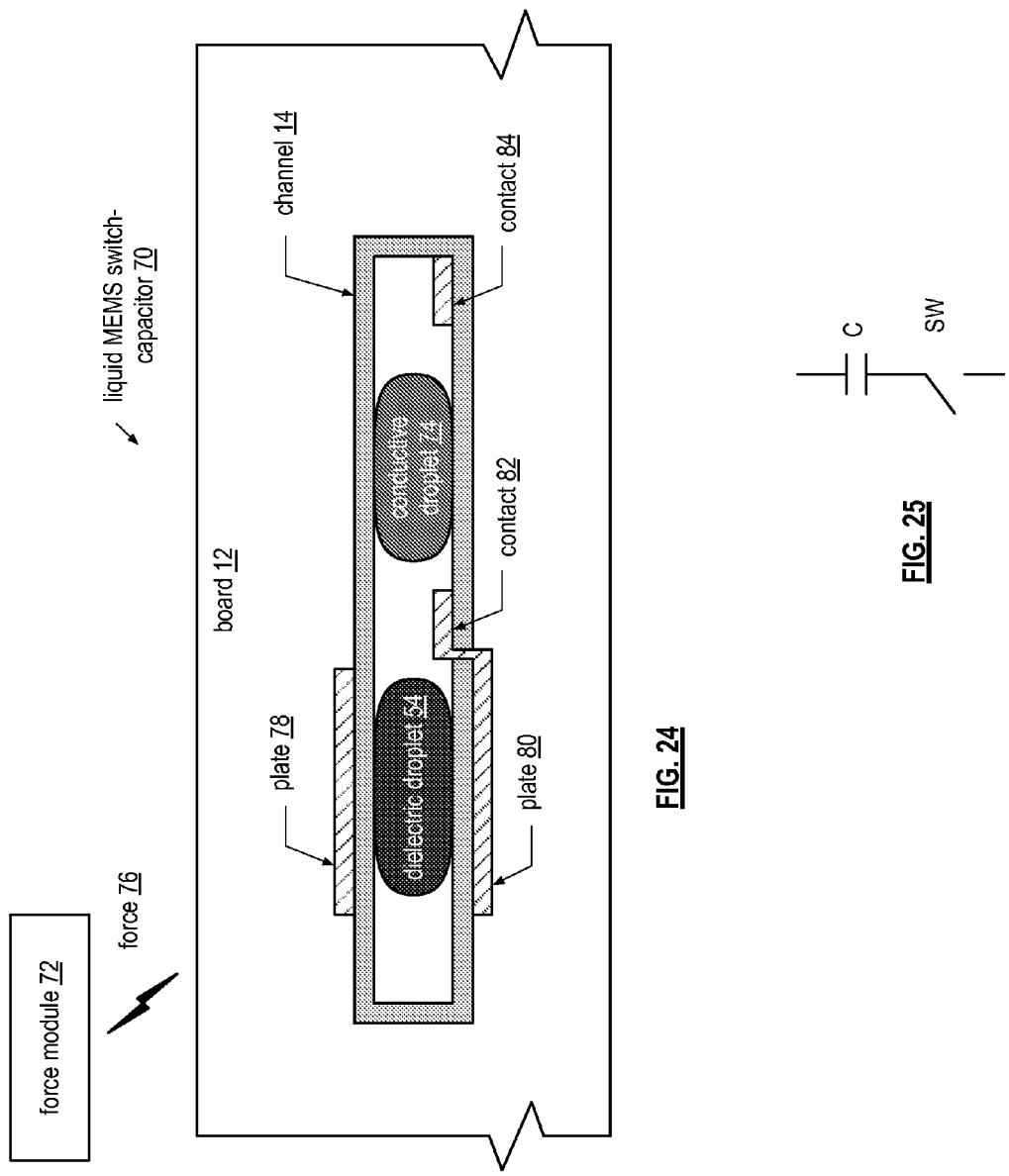

MULTIPLE DROPLET LIQUID MEMS COMPONENT

CROSS REFERENCE TO RELATED PATENTS

The present U.S. Utility Patent Application claims priority pursuant to 35 U.S.C. §119(e) to the following U.S. Provisional Applications which are incorporated herein by reference in their entirety and made part of the present U.S. Utility Patent Application for all purposes:
1. U.S. Provisional Application No. 61/699,183, entitled "Liquid Micro Electro Mechanical Systems (MEMS) Devices and Applications," filed Sep. 10, 2012, pending; and
2. U.S. Provisional Application No. 61/727,066, entitled "Multiple Droplet Liquid MEMS Component," filed Nov. 15, 2012, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to radio communications and more particularly to one or more liquid MEMS components that may be used wireless communication devices.

2. Description of Related Art

Radio frequency (RF) communication devices are known to facilitate wireless communications in one or more frequency bands in accordance with one or more wireless communication protocols or standards. To accommodate multiple communication protocols, or standards, an RF communication device includes multiple versions (one for each protocol) of each section of the RF communication device (e.g., baseband processing, RF receiver, RF transmitter, antenna interface) and/or includes programmable sections. For example, an RF communication device may include a programmable baseband section, multiple RF receiver sections, multiple RF transmitter sections, and a programmable antenna interface.

To provide at least some of the programmable capabilities of a programmable section of an RF communication device, the section includes one or more programmable circuits, wherein the programmability is achieved via a switch-based bank of circuit elements (e.g., capacitors, inductors, resistors). For instance, selecting various combinations of a switch-based bank of capacitors and switch-based bank of inductors yields various resonant tank circuits that can be used in filters, as loads in amplifiers, etc. A recent advance in RF technology is to use integrated circuit (IC) micro-electromechanical system (MEMS) switches to provide the switches of a switch-based bank of circuit elements.

Issues with IC MEMS switches include minimal contact areas (which creates heat spots), bouncing of electrical contact (which limits use to cold switching), and a limited life cycle. In response to these issues, more recent advances in RF technology employ IC implemented liquid RF MEMS switches (which may also be referred to as electro-chemical wetting switches). As IC fabrication technologies continue to evolve and reduce the size of IC dies and components fabricated thereon, IC implemented liquid RF MEMS switches may have limited applications.

BRIEF DESCRIPTION OF THE SEVERAL VIEWS OF THE DRAWING(S)

FIGS. 4 and 5 are schematic block diagrams of another embodiment of a multiple droplet liquid MEMS capacitor in accordance with the present invention;

FIGS. 8 and 9 are schematic block diagrams of another embodiment of a multiple droplet liquid MEMS inductor in accordance with the present invention;

FIGS. 10 and 11 are schematic block diagrams of an embodiment of a multiple droplet liquid MEMS transformer in accordance with the present invention;

FIGS. 12 and 13 are schematic block diagrams of another embodiment of a multiple droplet liquid MEMS transformer in accordance with the present invention;

FIG. 15 is a schematic block diagram of an embodiment of a multiple droplet liquid MEMS inductor-capacitor in accordance with the present invention;

FIG. 16 is a schematic diagram of an embodiment of a multiple droplet liquid MEMS inductor-capacitor in accordance with the present invention;

FIG. 17 is a schematic block diagram of an embodiment of conductive elements of a multiple droplet liquid MEMS inductor-capacitor in accordance with the present invention;

FIG. 18 is a schematic diagram of another embodiment of a multiple droplet liquid MEMS inductor-capacitor in accordance with the present invention;

FIG. 19 is a schematic diagram of another embodiment of a multiple droplet liquid MEMS inductor-capacitor in accordance with the present invention;

FIG. 20 is a schematic diagram of another embodiment of a multiple droplet liquid MEMS inductor-capacitor in accordance with the present invention;

FIG. 21 is a schematic diagram of another embodiment of a multiple droplet liquid MEMS inductor-capacitor in accordance with the present invention;

FIG. 24 is a schematic block diagram of an embodiment of a multiple droplet liquid MEMS switch-capacitor in accordance with the present invention; and FIG. 25 is a schematic diagram of an embodiment of a multiple droplet liquid MEMS switch-capacitor in accordance with the present invention.

DETAILED DESCRIPTION OF THE INVENTION

Figure 1:
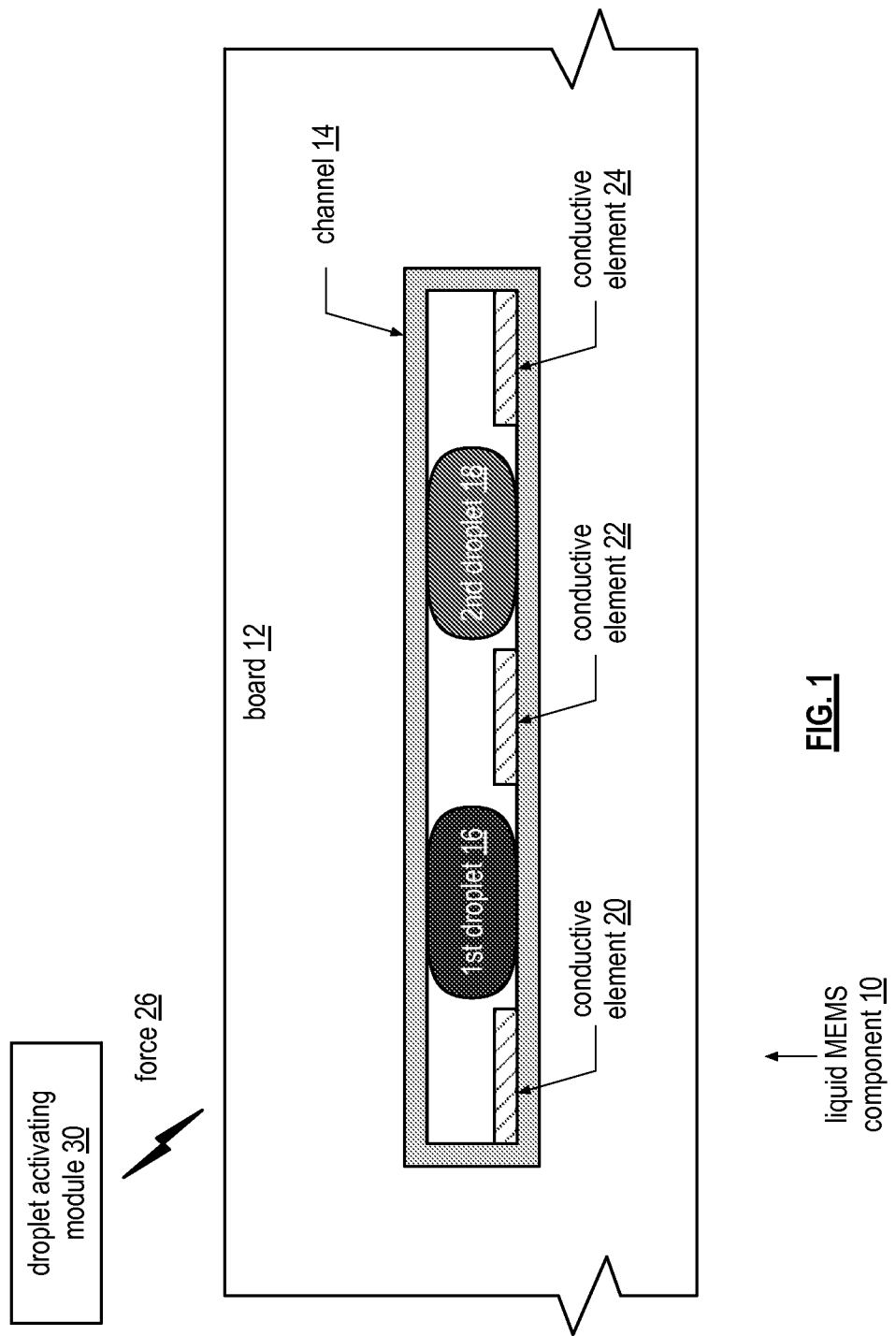
FIG. 1 is a schematic block diagram of an embodiment of a multiple droplet liquid MEMS component in accordance with the present invention.

FIG. 1 is a schematic block diagram of an embodiment of a multiple droplet liquid MEMS component 10 that includes a board 12, a channel 14, a first liquid droplet 16, a second liquid droplet 18, and conductive elements 20-24. The liquid MEMS component 10 may further include a droplet activating module 30 that applies a force 26 on one or more of the droplets 16 and 18. Each of the droplets 16 and 18 may be one or more of an electrically conductive droplet (e.g., mercury or other metal or electrically conductive substance that is in a liquid state at room temperature), a liquid insulating droplet, an expanding liquid droplet that expands in response to the force 26, a contracting liquid droplet that contracts in response to the force 26, a repelling liquid droplet that is repelled in response to the force 26, and an attraction liquid droplet that is attracted in response to the force 26.

The channel 14 may have a variety of shapes. For example, the channel 14 may have a square-tubular shape, a cylinder shape, a non-linear square-tubular shape, or a non-linear cylinder shape, where non-linear refers to the axial shape of the channel being something other than a straight line (e.g., a meandering line, an arc, a circle, an ellipse, a polygon, or a portion thereof). In addition, the channel 14 may have its internal and/or external walls coated with an insulating layer, dielectric layer, a semiconductor layer, and/or a conductive layer.

The droplet activating module 30 includes one or more sources. For example, the droplet activating module 30 may include one or more of an electric field source, a magnetic field source, a heat source, a compression source, a pressure source, and/or an expansion source to apply the force 26 (e.g., an electric field, a magnetic field, heat, mechanical actuation, compression, pressure, etc.). As a specific example, a first source applies a first force on the first droplet 16 to actuate, alter, move, compress, expand, etc. the first droplet 16 and a second source applies a second force on the second liquid droplet 18 to actuate, alter, move, compress, expand, etc. the second droplet 18 to facilitate the characteristic change of the liquid MEMS component 10.

The liquid MEMS component 10 may be used in a variety of devices, such as a portable computing communication device, a touch sensitive device, a remote control device, a keyboard, a key pad, a video gaming unit, etc. A portable computing communication device may be any device that can be carried by a person, can be at least partially powered by a battery, includes a radio transceiver (e.g., radio frequency (RF) and/or millimeter wave (MMW)) and performs one or more software applications. For example, the portable computing communication device may be a cellular telephone, a laptop computer, a personal digital assistant, a video game console, a video game player, a personal entertainment unit, a tablet computer, etc.

With a wide variety of applications, the size of the liquid MEMS component 10 may range dramatically. For example, the size of the channel may be one or more centimeters by one or more centimeters for user touch applications (e.g., touchscreen, keypad, etc.). As another example, the size of the channel may be a fraction of a millimeter by a fraction of a millimeter for circuit applications. In addition, the liquid MEMS component 10 is fabricated or embedded on a board (e.g., printed circuit board (PCB), integrated circuit (IC) package substrate, a redistribution layer (RDL) of a PCB or of an IC package substrate etc.) while a majority of the circuitry of a device is implemented on one or more integrated circuit (IC) dies. For instance, activation circuitry and/or interpreting circuit associated with the liquid MEMS component 10 may be implemented on an IC die and the liquid MEMS component 10 is implemented or embedded on a board. Further, the board may support the one or more IC dies of a device.

In an example of operation, as the droplet activating module 30 applies the force 26 on the first and second liquid droplets 16 and 18, the droplets change in accordance with their respective properties. For example, the first liquid droplet 16 changes in accordance with first properties (e.g., one or more of a first density, a first conductivity, a first permittivity, a first permeability, a first expansion factor, a first contraction factor, and a first viscosity (property of a fluid that resists flowing)). In addition, the second liquid droplet 18 is changing in accordance with its properties (e.g., one or more of a second density, a second conductivity, a second permittivity, a second permeability, a second expansion factor, a second contraction factor, and a second viscosity).

As the first and second liquid droplets 16 and 18 are changing with respect to the conductive elements 20-24, one or more characteristics of the liquid MEMS component 10 is changing. The characteristics of the liquid MEMS component 10 include one or more of capacitance, inductance, dielectric property, magnetic coupling property, on/off state of a switch, etc.

In another example of operation, the liquid MEMS component 10 functions as a switch network, where the first liquid droplet 16 includes a first conductive droplet, the second liquid droplet 18 includes a second conductive droplet, and the conductive elements 20-24 includes a first pair of electrical contacts and a second pair of electrical contacts. When the force 26 is applied at a first level, the first conductive droplet 16 electrically couples to the first pair of electrical contacts and the second conductive droplet 18 is not making electrical contact with the second pair of electrical contacts. When the force 26 is applied at a second level, the second conductive droplet 18 electrically couples to the second pair of electrical contacts. Note that the force 26 at the first level may be applied by a first source for the first droplet 16 and the force 26 at the second level may be applied by a second source for the second droplet 18 or the force 26 at different levels may be applied by the same source.

Figure 2:
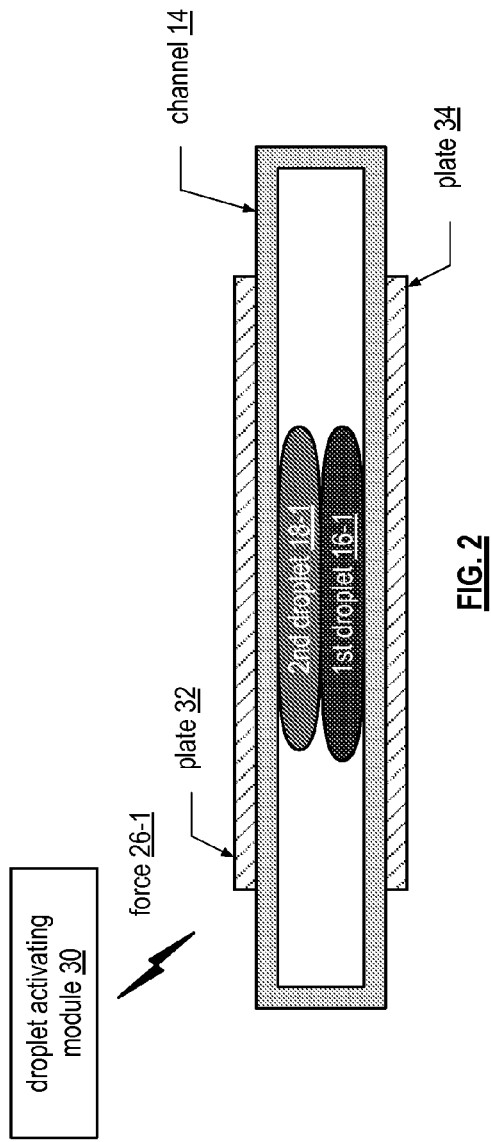
FIGS. 2 and 3 are schematic block diagrams of an embodiment of a multiple droplet liquid MEMS capacitor in accordance with the present invention.
Figure 3:
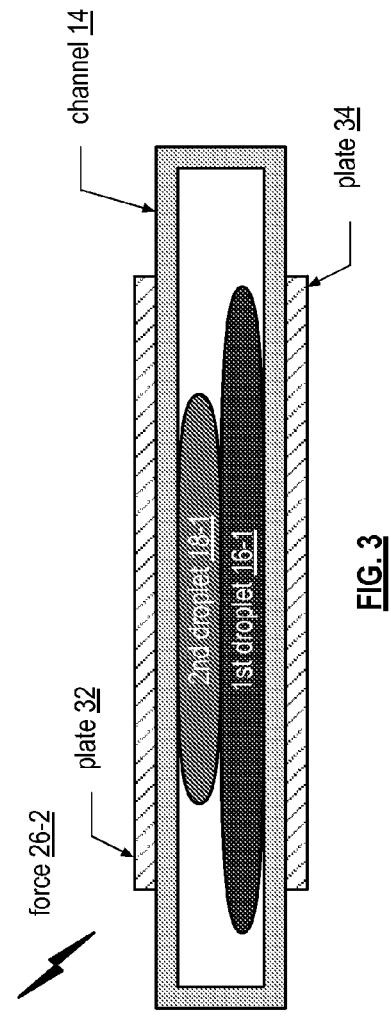

FIGS. 2 and 3 are schematic block diagrams of an embodiment of a multiple droplet liquid MEMS capacitor that includes the channel 14, a first dielectric doped droplet 16-1, a second dielectric doped droplet 18-1, first and second capacitive plates 32 and 34, and the droplet activating module 30. In general, each dielectric doped droplet 16-1 and 18-1 includes a non-conductive liquid solution (e.g., magnetically and/or electrically inert liquid, gel, oil, etc.) and a plurality of dielectric particles suspending in the liquid solution. The particles may be porcelain, glass, and/or plastic particles. Note that the non-conductive liquid solution has a density that enables suspension of the particles. Further note that the particles may be coated with a material to reduce their individual densities. Alternatively, the dielectric doped droplets may be a liquid colloid of the non-conductive liquid solution and the particles or a hydrocolloid that includes the particles. Note that the non-conductive liquid solution may expand, contract, change its shape, and/or changes its position in the channel in response to the force 26 and that first dielectric doped droplet 16-1 has first properties and the second dielectric doped droplet 18-1 has second properties. For example, the first dielectric doped droplet 16-1 includes a non-conductive liquid solution having a first density, a first reaction (e.g., expand, contract, move, change shape, etc.) to the force 26, and/or a first concentration of dielectric particles and the second dielectric doped droplet 18-1 includes a non-conductive liquid solution having a second density, a second reaction to the force 26, and/or a second concentration of dielectric particles.

In this embodiment, each droplet 16-1 and 18-1 changes their shapes in the presence of the force 26. For example, with a minimal force 26-1 applied as shown in FIG. 2, the droplets are in a contracted shape and are approximately the same size, which provides a first dielectric property for the capacitor. When a sufficiently large (or active) force 26-2 is applied as shown in FIG. 3, the shape of the droplets 16-1 and 18-1 changes, which changes the dielectric properties of the capacitor. Note that the capacitance of a capacitor is $C=\in_r \in_0 (A/d)$, where C is the capacitance, A is the area of overlap of the two plates, $\in_r$ is the relative static permittivity (e.g., dielectric constant) of the material between the plates, $\in_0$ is the electric constant, and d is the distance between the two plates. In this instance, the dielectric constant is a combination of the dielectric properties of the first and second droplets. As such, by changing the dielectric properties (i.e., changing the droplets with respect to the plates), the dielectric constant is changed, which proportionally changes the capacitance.

FIGS. 4 and 5 are schematic block diagrams of another embodiment of a multiple droplet liquid MEMS capacitor that includes the channel 14, a first dielectric doped droplet 16-1, a second dielectric doped droplet 18-1, first and second capacitive plates 32 and 34, the droplet activating module 30, a first reservoir 36 and a second reservoir 38. The first reservoir 36 contains the first dielectric doped droplet 16-1 and the second reservoir 38 contains the second dielectric doped droplet 18-1.

In an example of operation, each droplet 16-1 and 18-1 is forced into the channel 14 at different rates in response to the force 26. For example, with a minimal force 26-1 applied as shown in FIG. 4, the droplets 16-1 and 18-1 remain substantially within their respective reservoirs 36 and 38, which provide a first dielectric property for the capacitor. When a sufficiently large (or active) force 26-2 is applied as shown in FIG. 5, the droplets 16-1 and 18-1 expand or are forced into the channel 14 at different rates, which changes the dielectric properties of the capacitor.

Figure 6:
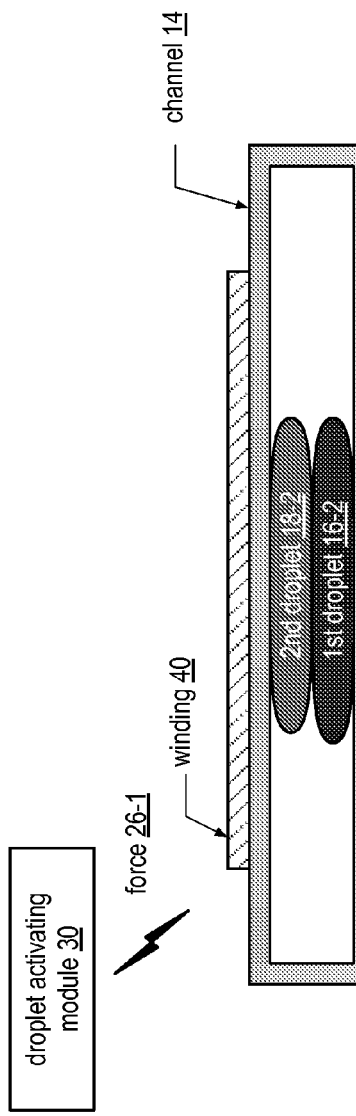
FIGS. 6 and 7 are schematic block diagrams of an embodiment of a multiple droplet liquid MEMS inductor in accordance with the present invention.
Figure 7:
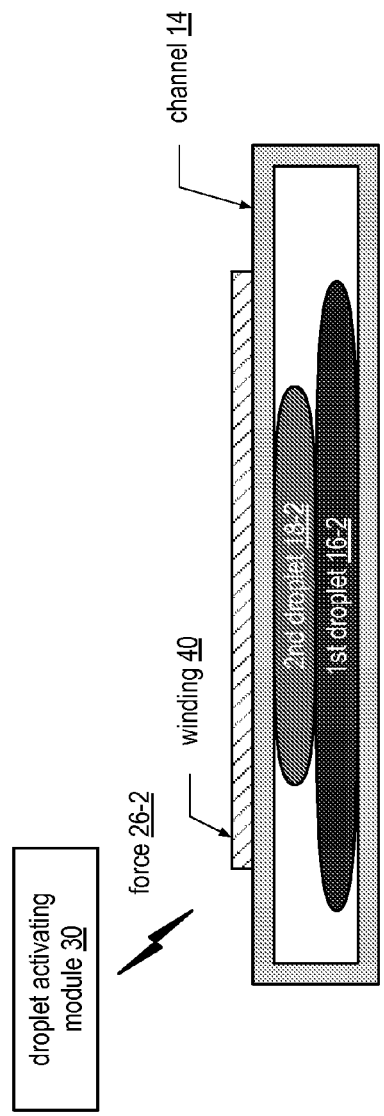

FIGS. 6 and 7 are schematic block diagrams of an embodiment of a multiple droplet liquid MEMS inductor that includes the channel 14, a first ferrite doped droplet 16-2, a second ferrite doped droplet 18-2, a winding 40 (e.g., a microstrip, a meandering line, a single turn coil, a multiple turn coil, a solenoid, etc.), and the droplet activating module 30. In general, each ferrite doped droplet 16-2 and 18-2 includes a non-conductive liquid solution (e.g., magnetically and/or electrically inert liquid, gel, oil, etc.) and a plurality of ferrite particles suspending in the liquid solution. The particles may be iron, magnets, and/or other iron core materials. Note that the non-conductive liquid solution has a density that enables suspension of the particles. Further note that the particles may be coated with a material to reduce their individual densities. Alternatively, the ferrite doped droplets may be a liquid colloid of the non-conductive liquid solution and the particles or a hydrocolloid that includes the particles. Note that the non-conductive liquid solution may expand, contract, change its shape, and/or changes its position in the channel in response to the force 26 and that first ferrite doped droplet 16-2 has first properties and the second ferrite doped droplet 18-2 has second properties. For example, the first ferrite doped droplet 16-2 includes a non-conductive liquid solution having a first density, a first reaction (e.g., expand, contract, move, change shape, etc.) to the force 26, and/or a first concentration of ferrite particles and the second dielectric doped droplet 18-2 includes a non-conductive liquid solution having a second density, a second reaction to the force 26, and/or a second concentration of ferrite particles.

In this embodiment, each droplet 16-2 and 18-2 changes their shapes in the presence of the force 26. For example, with a minimal force 26-1 applied as shown in FIG. 6, the droplets are in a contracted shape and are approximately the same size, which provides a first iron core property for the inductor. When a sufficiently large (or active) force 26-2 is applied as shown in FIG. 7, the shape of the droplets 16-2 and 18-2 changes, which changes the iron core properties of the inductor. Note that for a solenoid inductor, inductance is $L=\mu_0\mu_r N^2 (A/1)$, where L is inductance, $\mu_0$ is the magnetic constant, $\mu_r$ is the relative permeability of the material within the solenoid, N is the number of turns, A is the cross-sectional area of the solenoid, and 1 is the length of the winding. In this instance, the relative permeability is a combination of the dielectric properties of the first and second droplets. As such, by changing the core properties (e.g., changing the relative permeability by changing the droplets) of the inductor, its inductance is changed.

FIGS. 8 and 9 are schematic block diagrams of another embodiment of a multiple droplet liquid MEMS inductor that includes the channel 14, a first ferrite doped droplet 16-2, a second ferrite doped droplet 18-2, a winding 40, the droplet activating module 30, a first reservoir 36, and a second reservoir 38. The first reservoir 36 contains the first ferrite doped droplet 16-2 and the second reservoir 38 contains the second ferrite doped droplet 18-2.

In an example of operation, each droplet 16-2 and 18-2 is forced into the channel 14 at different rates in response to the force 26. For example, with a minimal force 26-1 applied as shown in FIG. 8, the droplets 16-2 and 18-2 remain substantially within their respective reservoirs 36 and 38, which provide a first relative permeability (e.g., air core) for the inductor. When a sufficiently large (or active) force 26-2 is applied as shown in FIG. 9, the droplets 16-2 and 18-2 expand or are forced into the channel 14 at different rates, which changes the relative permeability of the inductor.

FIGS. 10 and 11 are schematic block diagrams of an embodiment of a multiple droplet liquid MEMS transformer that includes the channel 14, a first ferrite doped droplet 16-2, a second ferrite doped droplet 18-2, a primary winding 42 (e.g., a microstrip, a meandering line, a single turn coil, a multiple turn coil, a solenoid, etc.), a secondary winding 44 (e.g., a microstrip, a meandering line, a single turn coil, a multiple turn coil, a solenoid, etc.), and the droplet activating module 30.

In this embodiment, each droplet 16-2 and 18-2 changes their shapes in the presence of the force 26. For example, with a minimal force 26-1 applied as shown in FIG. 10, the droplets are in a contracted shape and are approximately the same size, which provides a first iron core property (e.g., magnetic coupling, relative permeability, etc.) for the transformer. When a sufficiently large (or active) force 26-2 is applied as shown in FIG. 11, the shape of the droplets 16-2 and 18-2 changes, which changes the iron core properties of the transformer. In this instance, the relative permeability is a combination of the dielectric properties of the first and second droplets. As such, by changing the core properties (e.g., changing the relative permeability by changing the droplets) of the transformer, its magnetic coupling is changed.

FIGS. 12 and 13 are schematic block diagrams of another embodiment of a multiple droplet liquid MEMS transformer that includes the channel 14, a first ferrite doped droplet 16-2, a second ferrite doped droplet 18-2, a primary winding 42, a secondary winding 42, the droplet activating module 30, a first reservoir 36, and a second reservoir 38. The first reservoir 36 contains the first ferrite doped droplet 16-2 and the second reservoir 38 contains the second ferrite doped droplet 18-2.

In an example of operation, each droplet 16-2 and 18-2 is forced into the channel 14 at different rates in response to the force 26. For example, with a minimal force 26-1 applied as shown in FIG. 12, the droplets 16-2 and 18-2 remain substantially within their respective reservoirs 36 and 38, which provide a first relative permeability (e.g., air core) for the transformer. When a sufficiently large (or active) force 26-2 is applied as shown in FIG. 13, the droplets 16-2 and 18-2 expand or are forced into the channel 14 at different rates, which changes the relative permeability of the transformer.

Figure 14:
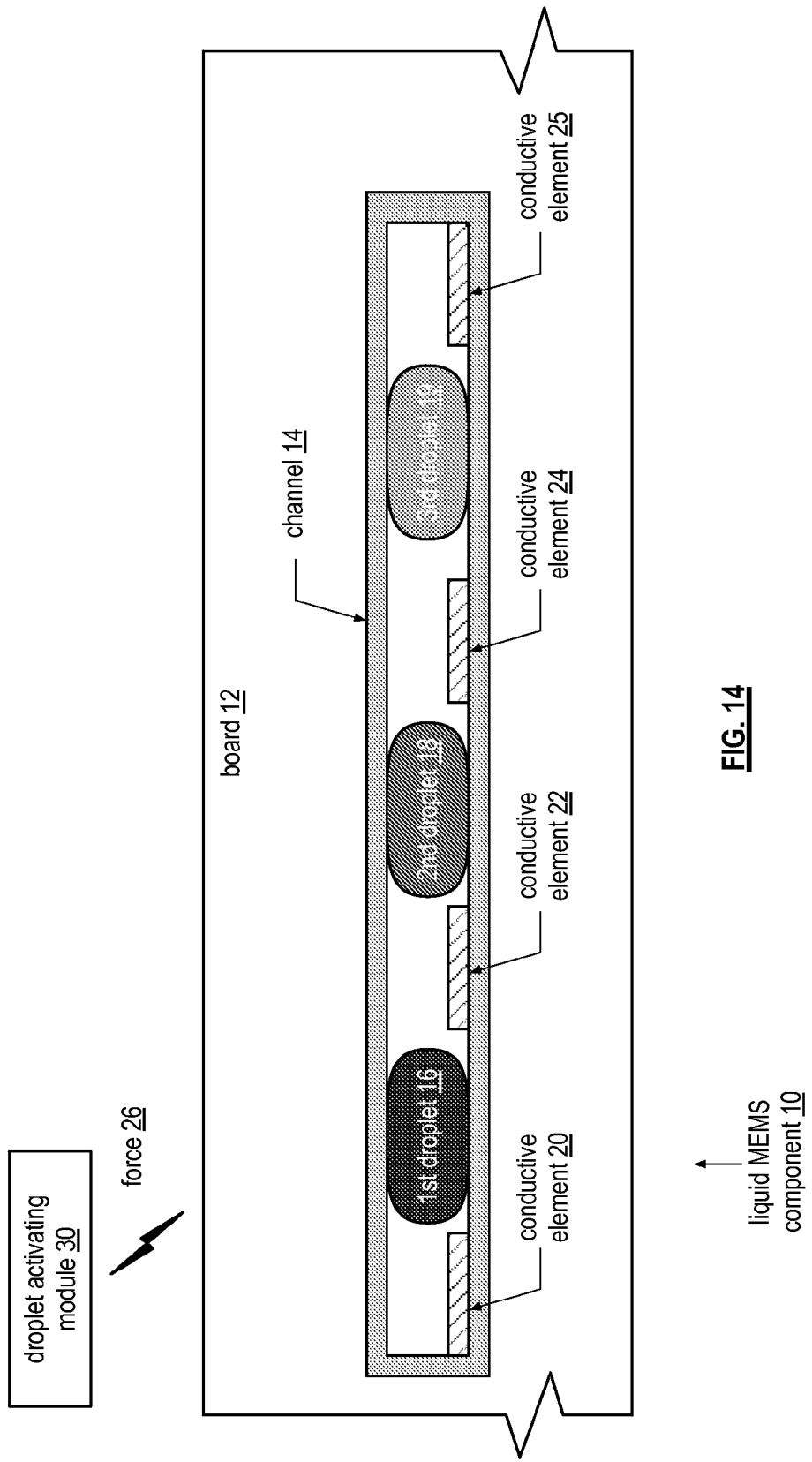
FIG. 14 is a schematic block diagram of another embodiment of a multiple droplet liquid MEMS component in accordance with the present invention.

FIG. 14 is a schematic block diagram of another embodiment of a multiple droplet liquid MEMS component 10 that includes a board 12, a channel 14, a first liquid droplet 16, a second liquid droplet 18, a third liquid droplet 19, and conductive elements 20-25. The liquid MEMS component 10 may further include a droplet activating module 30 that applies a force 26 on one or more of the droplets 16 18 19. Each of the droplets 16 18 19 may be one or more of an electrically conductive droplet (e.g., mercury or other metal or electrically conductive substance that is in a liquid state at room temperature), a liquid insulating droplet, an expanding liquid droplet that expands in response to the force 26, a contracting liquid droplet that contracts in response to the force 26, a repelling liquid droplet that is repelled in response to the force 26, and an attraction liquid droplet that is attracted in response to the force 26.

In an example of operation, as the droplet activating module 30 applies the force 26 on the first, second, and third liquid droplets 16 18 19, the droplets change in accordance with their respective properties. For example, the first liquid droplet 16 changes in accordance with first properties, the second liquid droplet 18 is changing in accordance with its properties, and the third droplet 19 changes in accordance with its properties (e.g., one or more of a third density, a third conductivity, a third permittivity, a third permeability, a third expansion factor, a third contraction factor, and a third viscosity). As the droplets 16 18 19 are changing with respect to the conductive elements 20-25, one or more characteristics of the liquid MEMS component 10 is changing. The characteristics of the liquid MEMS component 10 include one or more of capacitance, inductance, dielectric property, magnetic coupling property, on/off state of a switch, etc.

In another example of operation, the liquid MEMS component 10 functions as a switch network, where the first liquid droplet 16 includes a first conductive droplet, the second liquid droplet 18 includes a second conductive droplet, the third liquid droplet 19 includes a third conductive droplet, and the conductive elements 20-25 includes three pairs of electrical contacts. When the force 26 is applied at a first level, the first conductive droplet 16 electrically couples to the first pair of electrical contacts and the second and third conductive droplets 18 19 are not making electrical contact with their respective pair of electrical contacts. When the force 26 is applied at a second level, the second conductive droplet 18 electrically couples to the second pair of electrical contacts. When the force 26 is applied at a third level, the third conductive droplet 19 electrically couples to the third pair of electrical contacts.

FIG. 15 is a schematic block diagram of an embodiment of a multiple droplet liquid MEMS inductor-capacitor 50 that includes a board 12, a channel 14, a dielectric doped droplet 54, a ferrite doped droplet 52, a first conductive element 56, and a second conductive element 58. The liquid MEMS inductor-capacitor 50 may further includes a force module 60 that applies a force 62 (e.g., electric field force, a magnetic field force, a heat force, a pressure force, and an actuation force) on the droplets 52 and 54. The droplets 52 and 54 are contained with the channel.

In an example of operation, the liquid MEMS inductor-capacitor 50 provides a tunable inductor-capacitor (L-C), a schematic of which is shown in FIG. 16. With minimal force 62 applied the droplets are in first state (e.g., size, shape, position, etc.). In this state, the dielectric doped droplet 54 (which may be similar to droplet 16-1 or 18-1) provides a first dielectric constant for the capacitor formed by the first and second conductors 56 and 58. In addition, the ferrite doped droplet (which may be similar to droplet 16-2 or 18-2) provides a first relative permeability for the first conductor. As such, in this state, the liquid MEMS inductor-capacitor 50 has a first capacitance and a first inductance.

The droplets 52 and 54 change their shape, size, position, etc. as the force 62 is increased. As the droplets change, the dielectric doped droplet 54 provides a second dielectric constant for the capacitor formed by the first and second conductors 56 and 58. In addition, the ferrite doped droplet provides a second relative permeability for the first conductor. As such, in this state, the liquid MEMS inductor-capacitor 50 has a second capacitance and a second inductance. Note that the force module 60 may include two sources: one for the dielectric doped droplet 54 an another for the ferrite doped droplet 52 such that the capacitance and inductance of the liquid MEMS inductor-capacitor 50 may be individually tuned.

FIG. 17 is a schematic block diagram of an embodiment of conductive elements 56 and 58 of a multiple droplet liquid MEMS inductor-capacitor 50. As shown, the first conductive element 56 includes a winding 57 coupled to a first capacitor plate 55 and the second conductive element 58 includes a second capacitor plate 53. As is further shown, a first contact 66 is coupled to a first end of the first conductive element 56, a second contact 68 is coupled to a second end of the first conductive element 58, and a third contact 64 is coupled couple to the second conductive element 58. FIG. 18 depicts as schematic diagram of the liquid MEMS inductor-capacitor 50.

With the various contacts 64-68, the capacitor and inductor of the liquid MEMS inductor-capacitor 50 can be configured in a variety of ways. For example and as shown in FIG. 19, the capacitor and inductor of the multiple droplet liquid MEMS inductor-capacitor 50 are coupled in parallel. As another example and as shown in FIG. 20, the capacitor and inductor of the multiple droplet liquid MEMS inductor-capacitor 50 are coupled in series. As yet another example and as shown in FIG. 21, the capacitor and inductor of the multiple droplet liquid MEMS inductor-capacitor 50 are coupled as a filter.

Figure 23:
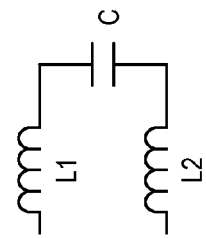
FIG. 23 is a schematic diagram of another embodiment of a multiple droplet liquid MEMS inductor-capacitor in accordance with the present invention.
Figure 22:
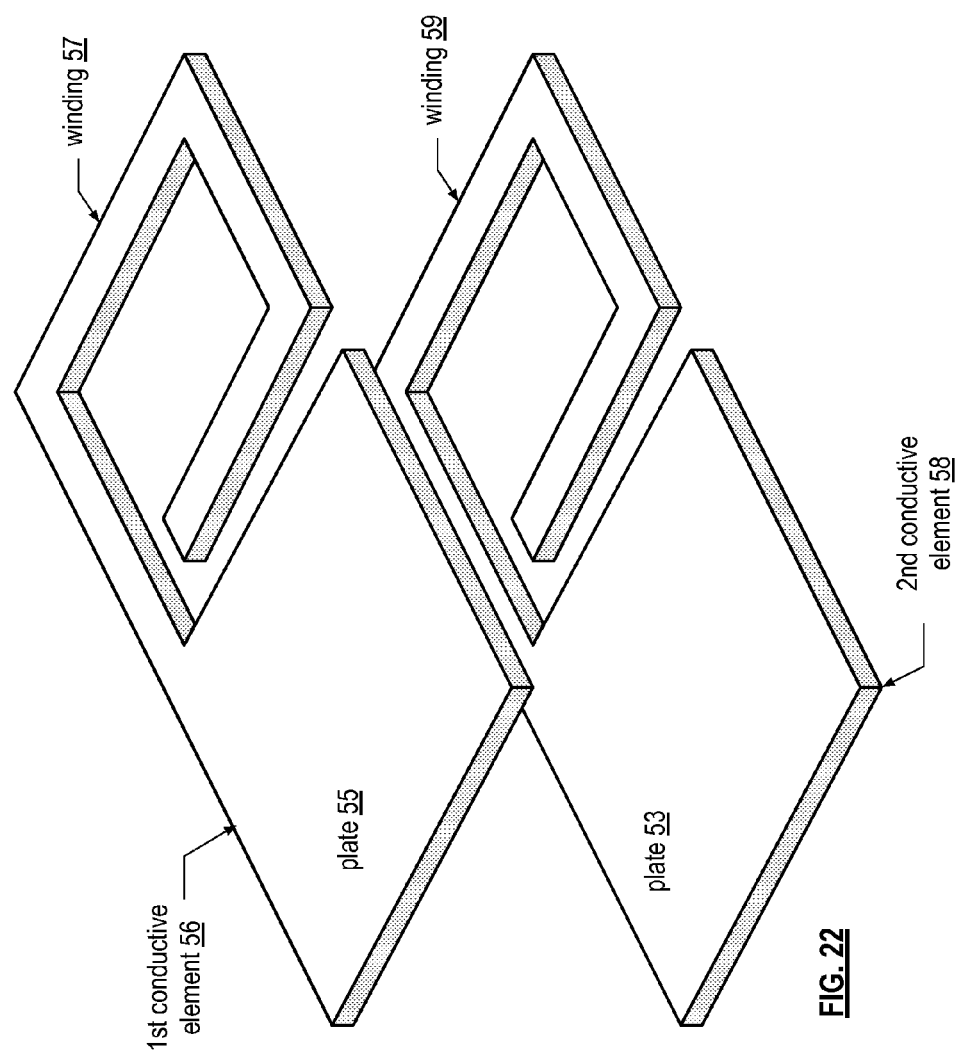
FIG. 22 is a schematic block diagram of an embodiment of conductive elements of a multiple droplet liquid MEMS inductor-capacitor in accordance with the present invention.

FIG. 22 is a schematic block diagram of an embodiment of conductive elements 56 and 58 of a multiple droplet liquid MEMS inductor-capacitor 50. As shown, the first conductive element 56 includes a winding 57 coupled to a first capacitor plate 55 and the second conductive element 58 includes another winding 59 a second capacitor plate 53. FIG. 23 depicts as schematic diagram of the liquid MEMS inductor-capacitor 50.

FIG. 24 is a schematic block diagram of an embodiment of a multiple droplet liquid MEMS switch-capacitor 70 that includes a board 12, a channel 14, a dielectric doped droplet 54, a conductive droplet 74, a first plate 78, a second plate 80, a first contact 82, a second contact 84. The liquid MEMS switch-capacitor 70 may further include a force module 72. A schematic diagram of the liquid MEMS switch-capacitor 70 is shown in FIG. 25.

In an example of operation, the force module 72 provides a force 76 (e.g., an electric field force, a magnetic field force, a heat force, a pressure force, and an actuation force) on the liquid MEMS switch-capacitor 70 such that the conductive droplet 74 changes with respect to the pair of electric contacts 82 and 84 and/or the dielectric doped droplet 54 changes with respect to the pair of capacitor plates 78 and 80 thereby changing an operational characteristic of the liquid MEMS switch-capacitor 70. As a more specific example, the conductive droplet 74 makes electrical contact with the contacts 82 and 84 when the force 76 is at an appropriate level. As another specific example, the dielectric doped droplet 54 changes the dielectric constant of the capacitor formed by the plates 78 and 80.

In another example of operation, the force 76 is varying at a particular frequency. In this instance, the conductive droplet 74 is making and breaking contact with the pair of electric contacts 82 and 84 in response to a varying force at the particular frequency. In this manner, the liquid MEMS switch-capacitor 70 is functioning as a switched capacitor. In addition, the dielectric doped droplet 54 may be changing capacitance of the liquid MEMS switch-capacitor 70 in response to the varying force to tune or adjust the switched capacitor function.

In yet another example of operation, the channel 14 includes a channel frame and a flexible side and the liquid MEMS switch-capacitor 70 further includes a pressure actuator to apply a pressure to the flexible side as the force 76. In this example, as pressure is applied to the flexible side, the shape of one or more of the droplets 54 and 74 change shape, which changes the dielectric properties of the capacitor of the liquid MEMS switch-capacitor 70 and/or changes on/off states of the switch of the liquid MEMS switch-capacitor 70.

In a further example of operation, the liquid MEMS switch-capacitor 70 includes a first reservoir that contains the dielectric doped droplet 54 and a second reservoir that contains the conductive droplet 74. The liquid MEMS switch-capacitor 70 further includes a pressure actuator to apply a first pressure on the first reservoir and a second pressure on the second reservoir. When the first pressure is applied to the first flexible reservoir, the conductive droplet 74 is forced into the channel, which changes operational properties (e.g., on/off states) of the switch of the liquid MEMS switch-capacitor 70. When the second pressure is applied to the second flexible reservoir, the dielectric doped droplet 54 is forced into the channel, which changes the dielectric constant of the capacitor of the liquid MEMS switch-capacitor 70.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A liquid micro-electro-mechanical system (MEMS) component comprises:
    a board;
    a channel within the board;
    a first magnetic liquid droplet contained within the channel, wherein the first magnetic liquid droplet has first properties;
    a second magnetic liquid droplet contained within the channel, wherein the second magnetic liquid droplet has second properties; and
    one or more conductive elements proximal to the channel, wherein, when a force is applied upon the first and second magnetic liquid droplets, the first magnetic liquid droplet changes in accordance with the first properties with respect to the one or more conductive elements and the second magnetic liquid droplet changes in accordance with the second properties with respect to the one or more conductive elements thereby changing one or more characteristics of the liquid MEMS component.

2. The liquid MEMS component of claim 1 further comprises:
    a droplet activating module operable to generate the force in response to a control signal, wherein the force includes one or more of: an electric field, a magnetic field, heat, compression, expansion, and mechanical actuation.

3. The liquid MEMS component of claim 1 further comprises:
    the first properties including one or more of: a first density, a first conductivity, a first permittivity, a first permeability, a first expansion factor, a first contraction factor, and a first viscosity; and
    the second properties including one or more of: a second density, a second conductivity, a second permittivity, a second permeability, a second expansion factor, a second contraction factor, and a second viscosity.

4. The liquid MEMS component of claim 1 further comprises:
    the first magnetic liquid droplet including a first dielectric doped droplet;
    the second magnetic liquid droplet including a second dielectric doped droplet; and
    the one or more conductive elements including first and second capacitive plates, wherein, when the force is applied, the first dielectric doped droplet changes in accordance with the first properties with respect to the first and second capacitive plates and the second dielectric doped droplet changes in accordance with the second properties with respect to the first and second capacitive plates such that the liquid MEMS component functions as a variable capacitor.

5. The liquid MEMS component of claim 1 further comprises:
    the first magnetic liquid droplet including a first ferrite doped droplet;
    the second magnetic liquid droplet including a second ferrite doped droplet; and
    the one or more conductive elements including a winding, wherein, when the force is applied, the first ferrite doped droplet changes in accordance with the first properties with respect to the winding and the second ferrite doped droplet changes in accordance with the second properties with respect to the winding such that the liquid MEMS component functions as a variable inductor.

6. The liquid MEMS component of claim 1 further comprises:

the first magnetic liquid droplet including a first ferrite doped droplet;

the second magnetic liquid droplet including a second ferrite doped droplet; and the one or more conductive elements including a primary winding and a secondary winding, wherein, when the force is applied, the first ferrite doped droplet changes in accordance with the first properties with respect to the primary winding and the secondary winding and the second ferrite doped droplet changes in accordance with the second properties with respect to the primary winding and the secondary winding such that the liquid MEMS component functions as a variable transformer.

7. The liquid MEMS component of claim 1 further comprises:

the first magnetic liquid droplet including a first conductive droplet;

the second magnetic liquid droplet including a second conductive droplet; and the one or more conductive elements including a first pair of electrical contacts and a second pair of electrical contacts, wherein, when the force is applied at a first level, the first conductive droplet electrically couples to the first pair of electrical contacts and, when the force is applied at a second level, the second conductive droplet electrically couples to the second pair of electrical contacts such that the liquid MEMS component functions as a switch network.

8. The liquid MEMS component of claim 1, wherein the board comprises at least one of:

a printed circuit board (PCB);

an integrated circuit (IC) package substrate;

a redistribution layer (RDL) of a PCB or of an IC package substrate.

9. The liquid MEMS component of claim 1 further comprises:

a third magnetic liquid droplet contained within the channel, wherein the third magnetic liquid droplet has third properties, wherein, when the force is applied, the third magnetic liquid droplet changes in accordance with the third properties with respect to the one or more conductive elements thereby further changing the one or more characteristics of the liquid MEMS component.

10. A liquid micro-electro-mechanical system (MEMS) component comprises:

a board;

a channel within the board;

a first electrically conductive liquid droplet contained within the channel, wherein the first electrically conductive liquid droplet has first properties;

a second electrically conductive liquid droplet contained within the channel, wherein the second electrically conductive liquid droplet has second properties; and one or more conductive elements proximal to the channel, wherein, when a force is applied upon the first and second electrically conductive liquid droplets, the first electrically conductive liquid droplet changes in accordance with the first properties with respect to the one or more conductive elements and the second electrically conductive liquid droplet changes in accordance with the second properties with respect to the one or more conductive elements thereby changing one or more characteristics of the liquid MEMS component.

11. The liquid MEMS component of claim 10 further comprises:

a droplet activating module operable to generate the force in response to a control signal, wherein the force includes one or more of: an electric field, a magnetic field, heat, compression, expansion, and mechanical actuation.

12. The liquid MEMS component of claim 10 further comprises:

the first properties including one or more of: a first density, a first conductivity, a first permittivity, a first permeability, a first expansion factor, a first contraction factor, and a first viscosity; and the second properties including one or more of: a second density, a second conductivity, a second permittivity, a second permeability, a second expansion factor, a second contraction factor, and a second viscosity.

13. The liquid MEMS component of claim 10 further comprises:

the first electrically conductive liquid droplet including a first ferrite doped droplet;

the second electrically conductive liquid droplet including a second ferrite doped droplet; and the one or more conductive elements including a winding, wherein, when the force is applied, the first ferrite doped droplet changes in accordance with the first properties with respect to the winding and the second ferrite doped droplet changes in accordance with the second properties with respect to the winding.

14. The liquid MEMS component of claim 10 further comprises:

the first electrically conductive liquid droplet including a first ferrite doped droplet;

the second electrically conductive liquid droplet including a second ferrite doped droplet; and the one or more conductive elements including a primary winding and a secondary winding, wherein, when the force is applied, the first ferrite doped droplet changes in accordance with the first properties with respect to the primary winding and the secondary winding and the second ferrite doped droplet changes in accordance with the second properties with respect to the primary winding and the secondary winding.

15. The liquid MEMS component of claim 10 further comprises:

the first electrically conductive liquid droplet including a first conductive droplet;

the second electrically conductive liquid droplet including a second conductive droplet; and the one or more conductive elements including a first pair of electrical contacts and a second pair of electrical contacts, wherein, when the force is applied at a first level, the first conductive droplet electrically couples to the first pair of electrical contacts and, when the force is applied at a second level, the second conductive droplet electrically couples to the second pair of electrical contacts.

16. The liquid MEMS component of claim 10, wherein the board comprises at least one of:

a printed circuit board (PCB);

an integrated circuit (IC) package substrate;

a redistribution layer (RDL) of a PCB or of an IC package substrate.

17. The liquid MEMS component of claim 10 further comprises:

a third electrically conductive liquid droplet contained within the channel, wherein the third electrically conductive liquid droplet has third properties, wherein, when the force is applied, the third liquid droplet changes in accordance with the third properties with respect to the one or more conductive elements thereby further changing the one or more characteristics of the liquid MEMS component.

18. A liquid micro-electro-mechanical system (MEMS) component comprises:
- a board;
- a channel within the board;
- a first electrically conductive liquid droplet contained within the channel, wherein the first electrically conductive liquid droplet has first electrically conductive properties;
- a second electrically conductive liquid droplet contained within the channel, wherein the second electrically conductive liquid droplet has second electrically conductive properties; and
- one or more conductive elements proximal to the channel, wherein, when a force is applied upon the first and second electrically conductive liquid droplets, the first electrically conductive liquid droplet changes in accordance with the first electrically conductive properties with respect to the one or more conductive elements and the second electrically conductive liquid droplet changes in accordance with the second electrically conductive properties with respect to the one or more conductive elements thereby changing one or more characteristics of the liquid MEMS component.

19. The liquid MEMS component of claim 18 further comprises:
- the first electrically conductive properties including one or more of: a first conductivity, a first permittivity and a first permeability; and
- the second electrically conductive properties including one or more of: a second conductivity, a second permittivity and a second permeability.

20. The liquid MEMS component of claim 18 further comprises:
- a third electrically conductive liquid droplet contained within the channel, wherein the third electrically conductive liquid droplet has third electrically conductive properties, wherein, when the force is applied, the third liquid droplet changes in accordance with the third electrically conductive properties with respect to the one or more conductive elements thereby further changing the one or more characteristics of the liquid MEMS component.

* * * * *